Patented Jan. 29, 1935

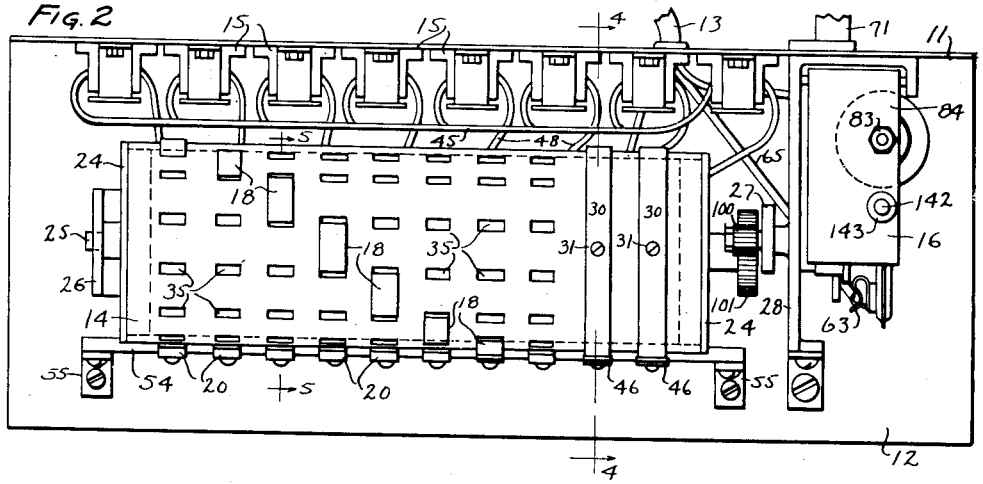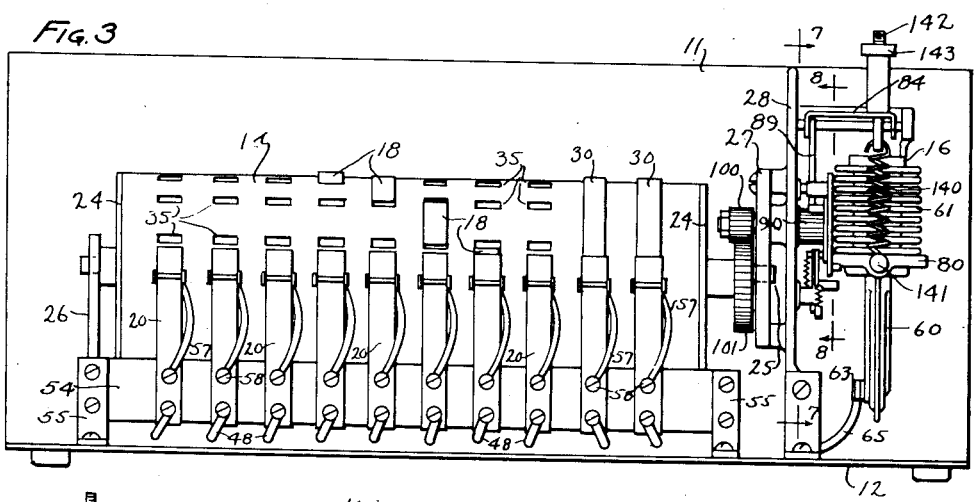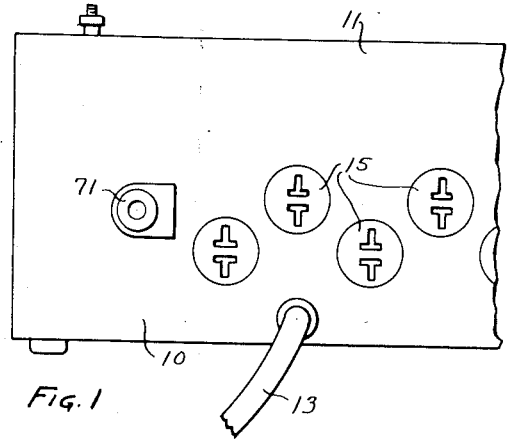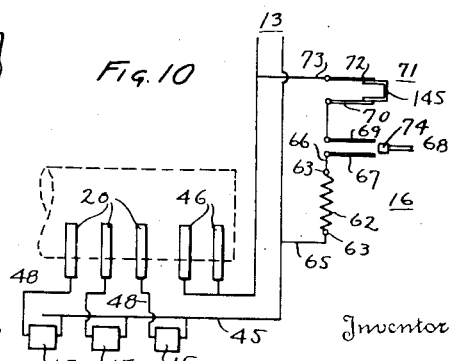

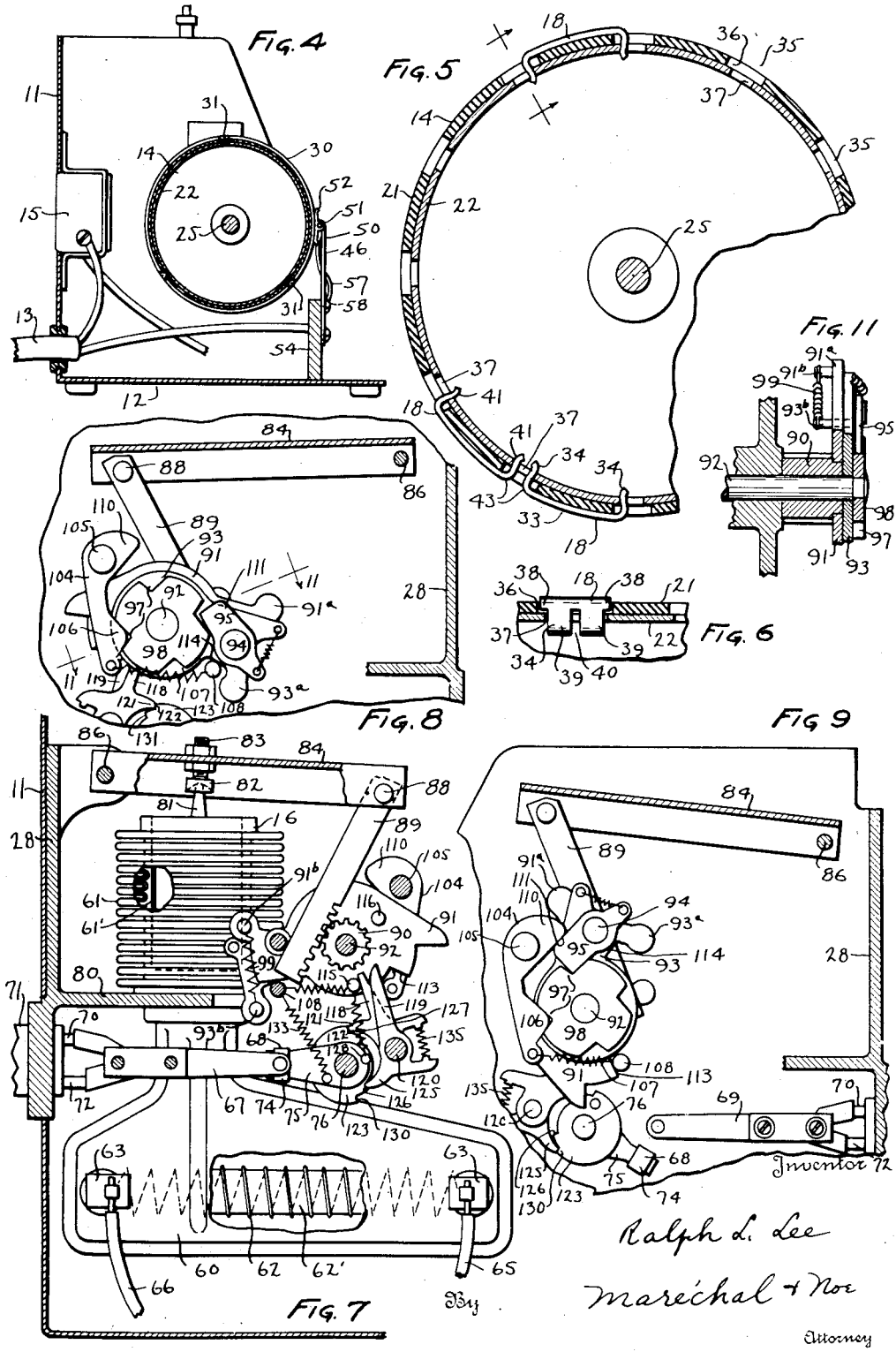
Jan. 29, 1935.  R. L. LEE  1,989,620
ELECTRICAL ACTUATOR
Filed June 13, 1932   2 Sheets-Sheet 2

1,989,620

UNITED STATES PATENT OFFICE 1,989,620

ELECTRICAL ACTUATOR

Ralph L. Lee, Dayton, Ohio, assignor, by mesne assignments, to Motion Picture Engineering Company, a corporation of Michigan Application June 13, 1932, Serial No. 616,924

3 Claims. (Cl. 200—8)

This invention relates to circuit controllers.

One of the principal objects of the invention is the provision of a compact, self-contained, readily portable circuit controller of simple and cheap construction for governing the selective energization of a plurality of circuits in any desired sequence.

Another object of the invention is the provision of such a circuit controller comprising a rotatable drum and actuating mechanism therefor; the drum having removably mounted contact clips which may be readily arranged to provide circuit energization of selected sequence and desired duration.

Other objects and advantages of the invention will be apparent from the following description, the accompanying drawings and the appended claims.

In the drawings, which disclose a preferred embodiment of the invention,—

Fig. 1 is a fragmentary front elevational view of a circuit controller constructed in accordance with this invention;

Fig. 2 is a plan view of the circuit controller with the cover removed;

Fig. 3 is a rear elevational view of the circuit controller, also with the cover removed;

Fig. 4 is a sectional view taken on the line 4—4 of Fig. 2;

Fig. 5 is an enlarged sectional view taken on the line 5—5 of Fig. 2;

Fig. 6 is a fragmentary sectional view taken on the line 6—6 of Fig. 5;

Fig. 7 is a sectional view taken on the line 7—7 of Fig. 3 showing the parts of the actuating mechanism at the beginning of an actuating stroke;

Fig. 8 is a fragmentary sectional view taken on the line 8—8 of Fig. 3 showing the parts in the same position as in Fig. 7;

Fig. 9 is a view taken similarly to Fig. 8 showing the parts at the end of an actuating stroke;

Fig. 10 is a diagrammatic showing of the electrical connections; and

Fig. 11 is a sectional view taken on the line 11—11 of Fig. 8.

In the drawings, in which like reference characters designate like parts throughout the several views thereof, the numeral 10 designates the circuit controller frame comprising a front panel 11, and a bottom panel 12. The circuit controller comprises generally a switching drum 14 by which circuits leading to outlet connections 15 are selectively energized, and an actuating mechanism or motor 16 for rotating the drum 14. A flexible cable 13 is provided to connect the actuating mechanism and the switching drum to a source of electrical energy.

The path of current flow through the controller to energize the several outlet connections 15 is from the cable 13 through the rotatable drum 14, which is constructed to receive conductor clips 18 in various selected positions, to permit a desired sequence and duration of energization at the outlets 15 by engagement of these clips with stationary contacts 20. The outlets may, for example, be connected to different portions of a sign or some advertising display wherein it is desired to energize the various portions at different times and for intervals of varying length.

As shown, the switching drum 14 comprises an insulating tube 21, formed of some suitable material such as bakelite, enclosing a conducting sleeve 22 of some suitable material such as brass. The tube 21 is mounted upon end plates 24 which in turn are supported upon an axle 25. The axle takes its bearing in a bracket 26 at one end of the drum, and in a plate 27 that is supported from a bracket 28 at the other end of the drum. The drum is freely rotatable in the bracket bearings.

The metal sleeve 22 is energized by provision of metal collector rings 30 on the exterior of the tube, and which are connected electrically to the sleeve 22. As shown, the collector rings are duplicated to assure a good connection to the drum. They comprise cylindrical bands that fit closely on the exterior of the tube 21. A current carrying path is provided by screws 31 which hold the rings to the tube and threadedly engage the sleeve 22.

The outlet connections 15 are energized from the clips 18 inserted in annularly spaced sets of slots 35 on the drum face and contacting with the conducting sleeve 22. As shown, the clips are formed of sheet metal and comprise a body portion 33 that is curved to the radius of the drum face, and inturned ends 34 of sufficient length to pass through the slots 35 and resiliently engage the conducting sleeve 22 at the slot openings. The slots through the drum 14 are of stepped formation, that is, the length and width of slot portion 36 forming an opening in the insulating tube 21 is somewhat larger than the length and width of the slot portion 37 forming an opening in the conducting sleeve 22. This proportioning of the slot provides for accurate positioning of the conducting clips 18 in that the clip width at the beginning of the inturned ends 34 is the same as the width of the body portion 33, and the width of the slot portion 37, in the direction of the drum axis, is just sufficient to accommodate these inturned parts 38. The balance of the clip ends are formed as tongue extensions 39 which extend from the clip part 38 a sufficient distance to pass through the sleeve openings 37. These tongue extensions 39 are preferably split by the provision of slots 40, and are curved, as indicated at 41, so as to resiliently grasp the walls of the adjacently related slots 37 when forced therein by finger pressure. By providing a slot opening in the tube part 36 of greater length, circumferentially, than the slot opening in the sleeve part 37, space is provided for accommodating the curvature 43 of the clip at the junction between the body part 33 and the ends 38. This clearance space permits the clips to lie in surface contact with the drum face. The slots are all similarly formed of such size that they will receive the adjacent ends of adjacently related clips so that by merely varying the number of adjacent circumferentially related clips the duration of circuit energization may be readily controlled.

Current from one wire of the supply lead 13 is carried to each of the outlets 15; the wire connection being designated by the numeral 45. The other wire of the supply circuit connects to stationary contacts 46 which bear against the collector rings 30 to energize the drum sleeve 22. The clips 18 are engageable by stationary contacts 20; each of which is connected by a wire 48 to the other side of each outlet 15. A circumferentially spaced set of slots 35 and a contact finger 20 are thus provided for each outlet 15, eight outlets 15 and eight sets of slots and contact fingers 20 being shown.

The stationary contact fingers 46 and 20, which are similar in form, each comprise a resilient strip 50 which has pivotally connected to it at 51 a shoe 52 which is approximately the same length as a conductor clip 18. The stationary fingers are all mounted side by side on a suitable insulating bar 54 supported by brackets 55 that are mounted upon the base 12 of the device. Flexible leads 57 are soldered to each shoe 52 and attached to the finger supporting screw 58 to insure a good electrical path from the shoe 52 to each lead wire connecting to each outlet 15.

The slots of each set are axially aligned. In the illustrated embodiment of the invention each circuit controlling set of slots has twelve slots equally spaced about the circumference of the drum. The clips are preferably of like size and of a length proportioned to the slot spacing so that each clip will engage any adjacently related pair of slots. If desired, clips of varying length may be provided, that is, of such length as to cover two or more slot spaces. Preferably, however, in accordance with the present invention the clips are all of unit length and interchangeable so they may be inserted in adjacent slots in the drum in a succession to provide continuous circuit energization for any desired interval. If clips are provided in all of the slots of a circumferentially related set, the circuit will be continuously energized. As mentioned, the clips are inserted by finger pressure. They may be readily removed by inserting a sharp flat object such as a knife blade between the clip body 33 and the drum face to pry them loose. As the slots are symmetrically arranged over the entire drum face the clips may be inserted in any desired order so that upon rotation of the drum the circuits will be energized in a desired sequence. To vary the duration of energization of any one circuit it is only necessary to insert in adjacently related slots the desired number of clips. When so arranged the circuit is energized for the total clip length as the spacing between the clips is sufficiently narrow that the shoe 52 will maintain the circuit closed during drum movement from one clip position to the next adjacent one. When the shoes 52 are not engaging clips 18 they bear against the face of the insulating tube 21. The shoe ends are upturned to facilitate engagement with the clips.

The drum is rotated by some suitable actuating means. As herein shown the actuating means is one providing an intermittent motion with a dwell in the positions wherein the shoes 52 are aligned with the clips 18, and somewhat rapid movement between these positions so as to prevent arcing as a shoe passes out of contacting engagement with a clip. The actuating mechanism is generally similar to that disclosed in my co-pending application Serial No. 548,161 filed July 1, 1931. It comprises an electrically heated expansible metal fluid container that expands as a result of the vaporization of the fluid upon the application of heat to provide an actuating movement for the drum. A hollow metal cell 60 is connected to an expansible metal bellows 61 and forms a closed container. The cell portion 60 contains a resistance wire 62 which is attached to terminals 63 for the connection of lead wires. The container is substantially filled with liquid such as ethylene dichloride which will vaporize readily upon being heated by closing the electrical circuit from the supply wires 13 to the resistance wire 62. The container as constructed has a rather limited liquid capacity so that the liquid will quickly be heated to vaporizing temperature upon closing the electric circuit, and will promptly build up sufficient pressure within the container to expand the bellows. The cell 60 has a large portion of its capacity taken up by the heater wire 62 and the mounting strip 62' upon which it is wound. The bellows has fitted within it an inverted cup 61' which is sealed to the top edge and projects down within the bellows so that the fluid capacity of this part is but little greater than the space within the annular ribs. As the bellows expands, the current to the heater wire is cut off so that the liquid can cool and so allow the bellows to again contract. The condensation of the liquid occurs soon after the opening of the resistance wire circuit, as the heat of the liquid is absorbed into the container walls and, due to the large surface area of these walls and the use of materials having high heat conductivity, the absorbed heat is quickly dissipated and the container is ready for another expanding movement. The cell walls are preferably made of copper and, if desired, may be provided with fins to aid in the dissipation of heat.

The operation of the bellows is controlled by an automatic switch that is actuated by bellows movement, and by a normally closed switch which may be operated manually when it is not desired to have the device operate automatically. As shown, a lead wire 65 connects a terminal 63 directly to one side of the supply lead 13, while another lead wire 66 connects to one stationary contact 67 of the automatically operated switch 68. The other stationary contact 69 of the switch is connected to one prong 70 of the normally closed switch 71 and the other prong 72 of this switch is connected by a wire 73 to the other wire of the supply lead 13. The switch 68, comprising the spaced stationary fingers 67 and 69, is operated by the movement of a conducting lug 74 that is carried on a rocking insulating member 75 mounted upon a shaft 76. With the circuit closed through the fingers 67 and 69 current flows through the resistance wire 62 to heat the liquid and expand the bellows 61. Expanding movement of the bellows rocks the member 75 to break the circuit between the fingers 67 and 69 thus opening the circuit to the resistance wire 26. Upon cooling of the liquid contents of the expansible container the bellows contracts and the member 75 again moves to close the circuit through the stationary switch fingers to again energize and expand the actuating mechanism.

The actuating mechanism is supported upon the bracket 28 which has a laterally extending shelf 80 upon which the cell 60 and bellows 61 are mounted. The free end of the bellows 61 carries a pin 81 which engages the socket end 82 of a screw 83 mounted on an arm 84 that is pivotally supported by a pin 86 carried upon the bracket 28. The free end of the arm 84 has pivotally connected to it at 88 a toothed rack 89 which engages a pinion 90 that is fixed to a plate 91. The assembly of pinion 90 and plate 91 is freely rotatable upon a shaft 92.

The plate 91 has a radially extending arm 91a which carries a perpendicularly projecting lug 91b. A second plate 93, also freely rotatable on the shaft 92 and positioned adjacent the plate 91, has a radially extending arm 93a which carries a perpendicularly projecting lug 93b. The lugs of the plates 91 and 93 are connected by a spring 99 which serves as a yielding connection through which the driving force is transmitted.

The plate 93 has pivotally mounted upon it at 94 a pawl 95 having a projecting finger 96 which successively engages and advances the teeth 97 of a ratchet 98 that is fixed to the shaft 92. Each expanding movement of the bellows 61 rocks the arm 84 upwardly and rotates the yieldingly connected plates 91 and 93 an amount sufficient to cause the pawl 95 to rotate the ratchet 98 by one tooth spacing. As shown, the ratchet is provided with four teeth and the advancing movement therefore amounts to 90°. The shaft 92 carries a pinion 100, see Fig. 3, which meshes with a gear 101 that is fixed to the drum axle 25 for rotation of the drum 14. The relationship between the pinion 100 and gear 101 is such that for each 90° advance of the shaft 92 the drum is caused to advance by the spacing of one slot; in the illustrated example this is $\frac{1}{12}$ of a revolution.

Overrunning of the drum at the end of an advancing stroke of the actuating mechanism, as a result of the inertia of the moving parts, is prevented by a locking lever 104 which positively stops rotation of the shaft 92 when the drive pawl 95 reaches the end of its stroke. As shown, the lever 104 rocks upon a shaft 105 that is mounted on the bracket 28. One end of the lever 104 is formed with a projecting wedge 106 of such shape as to engage a tooth 97 of the ratchet 98. This wedge part 106 is urged into engagement by provision of a spring 107 that is carried by a pin 108 mounted on the bracket 28. The opposite end of the lever 104 has formed upon it a finger 110 which is proportioned to engage a projection 111 on the pawl 95. As the pawl 95 approaches the end of its advancing stroke the projection 111 on the pawl engages the lever finger 110 and forces the wedge 106 into engagement with the ratchet tooth. This wedging movement effectively stops in a positive manner the rotation of the shaft 92 and the drum 14 which is geared to it. As the bellows contracts and thus moves the pawl 95 back to its starting position (as shown in Fig. 8) the lever 104 is released so that when the next advancing movement starts, the wedge 106 will be pushed out of the tooth 97 by the rotating ratchet 98 against the tension of the relatively light spring 107. However, locking engagement will again occur when the pawl 95 again strikes the finger 110. The spring supporting pin 108 also serves as a means of limiting the forward travel of the plate 91 by engagement with the projecting face 113 of this plate. Return movement of the plate 91 is limited by engagement of a face 114 with the same pin 108.

The dwell in the intermittent advance of the drum 14 occurs when the clip positions are in registration with the stationary contact shoes 52. The drum movement between the positions of dwell is quite rapid and as a result arcing of the contacts at the instant of break is effectively controlled. Initial movement of the drum upon closure of the switch controlling the flow of current to the heater wire is resisted by the friction of the mechanism, the tension of the spring 107 holding the wedge 106 in engagement with the ratchet and the tension of a spring 104 that serves to aid in the return of the expanded bellows to the initial position. This resistance is great enough to hold the drum stationary until sufficient pressure is built up in the container to overcome this initial resistance whereupon the advancing movement occurs quickly.

Actuation of the switch closing member 75 is effected by springs which are controlled by movement of the plate 91 through the medium of spaced pins 115 and 116 mounted on that plate. The release of the member 75 is governed by movement of rocking fingers 118 and 119 pivotally mounted on a stud 120 carried by the bracket 28 and are moved by engagement with the pins 115 and 116. The finger 118 carries a pawl projection 121 which engages a notch 122 on the peripheral face of a plate 123 attached to the switch closing member 75, and the finger 119 carries a pawl projection 125 which, in closed position of the switch, engages a notch 126 on the plate 123. These pawl projections are held in engagement with the notches by provision of a common spring 135. A spring 127 extends from a stud 128 on the member 75 to the stud 115 on the plate 91. As the plate 91 is rotated during expanding movement of the bellows the spring 127 is tensioned by movement of the pin 115 and tensions the member 75 so that when the pin 116 on the plate 91 swings around into engagement with the finger 119 and moves it to release the pawl projection 125 from engagement with the notch 126 the member 75 is then rotated by spring tension to open the switch; the movement being limited by engagement of the pawl projection 125 with a second notch 130. Upon this rotation of the plate 123 a notch 131 is moved for engagement by the pawl projection 121 to positively hold the switch member 74 in open position. When the plate 91 returns to the initial position the tension on the spring 127 is released so that when the pin 115 engages the finger 118 to lift the pawl projection 121 out of the notch 131 the tension of the spring 133 causes the member 75 to swing back to closed circuit position wherein the conducting part 74 stands in engagement between the fingers 67 and 69 of the switch to again energize the heater wire 62.

The yielding driving connection afforded by the spring 99 permits independent movement of the bellows should an excessive load be thrown on the mechanism, and thus serves as a safety measure to prevent damage to the bellows from excessive pressure which might occur if the device should be stalled with heating circuit closed.

The switch, including the member 75, that controls energization of the bellows heating element is actuated by movement of the plate 91, and this plate is operatively connected to the bellows through the positive driving connection including the rack 89. The plate 91 is connected to the driven load through the spring 99 which serves as a yielding connection that permits continued movement of the bellows even though the driven part is held against advance.

The plug switch 71 is normally short circuited so that the switch member 74 is the controlling element. When so operating, the device is entirely automatic and an actuating movement will occur each time the bellows is returned to its initial position. This return movement occurs upon condensation of the vaporized liquid. Movement of the parts of the actuating mechanism to initial position is aided by the spring 140 which extends between a lug 141 on the bracket part 80 and a threaded stud 142 that engages an adjusting nut 143 mounted on the arm 84. The tensioned spring 140 serves to pull the bellows back to contracted position as soon as the pressure of the vaporized liquid has decreased to an amount less than the pressure exerted by this spring. The frequency of automatic operation can be adjusted by varying the tension of the spring 140.

Manual actuation of the device is accomplished by removing the short circuiting element 145 from the switch 71 and attaching a two wire cable which is connected to some remotely positioned switch so that upon closure of this switch the circuit is completed through the resistance wire 62. When the device is operating in this manner the switch element 74 serves to automatically open the circuit even though the remotely positioned switch might continue to be closed. The plug switch 71, when short circuited, serves as a convenient switch for breaking the circuit through the actuating mechanism, this being accomplished by merely removing the plug 71.

This circuit controller provides a convenient and inexpensive means of selectively energizing a plurality of electric circuits in desired sequence. The circuit controller is compact and is self-contained so that it is readily portable and can be used equally well as a permanent installation or for temporary service.

The current supply cable is an integral part of the unit so that to energize the unit it is only necessary to plug the supply cable into a convenient current outlet. The circuits within the controller terminate in outlet plugs so that connections to the controller are made by merely inserting a cable plug in an outlet fitting. The individual circuits are independently controlled and are readily changed as desired by a mere arrangement of the standard clips; the clip spacing being such as to permit a circuit to be energized for a desired portion of a complete revolution of the drum or for continuous energization. The actuating means is adapted for continued service and provides a regulated range of frequency of intermittent movement under control of an adjusting nut. In addition to the fully automatic operation, the controller is readily adapted for manual actuation by operation of switch 71 so that the drum is then advanced only upon manual closure of a switch.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a circuit controller of the character described, a rotatable drum, said drum having axially spaced series of circumferentially related slots therein, and clips attachable to the drum by engagement with the drum slots, said clips having resilient slot engaging portions attachable to the drum by pressure in a direction radially of the drum.

2. In a circuit controller of the character described, a rotatable drum, said drum comprising a nonconducting shell, a conducting sleeve within said shell, said drum having circumferentially spaced slots therein, and clips removably held to the drum by engagement through the slots with the conducting sleeve, and a contact member engageable with said clips.

3. In a circuit controller of the character described, a rotatable drum, said drum comprising a nonconducting shell, a conducting sleeve within said shell, said drum having circumferentially spaced slots therein, and preformed sheet metal clips attachable to said drum by engagement with the drum slots, said clips comprising a body portion curved to the radius of the drum periphery and inturned ends spaced to engage the drum sleeve at the drum slots, and a contact member engaged by the clips to control an electric circuit.

RALPH L. LEE.